United States Patent [19]

MacKenzie

[11] Patent Number: 4,994,795
[45] Date of Patent: Feb. 19, 1991

[54] POSITION INDICATING DEVICE FOR A DIGITAL COMPUTER

[76] Inventor: Kirk F. MacKenzie, 1558 Siesta Dr., Los Altos, Calif. 94022

[21] Appl. No.: 282,012

[22] Filed: Dec. 8, 1988

[51] Int. Cl.⁵ .............................................. G09G 5/00
[52] U.S. Cl. .................................. 340/710; 340/706; 340/711
[58] Field of Search ................ 340/710, 706, 709, 711

[56] References Cited

U.S. PATENT DOCUMENTS

| 4,333,097 | 6/1982 | Buric et al. | 340/711 |
| 4,369,439 | 1/1983 | Broos | 340/710 |
| 4,754,268 | 6/1988 | Mori | 340/710 |

OTHER PUBLICATIONS

IBM Technical Disclosure Bulletin vol. 27, No. 10 B, Mar. 1985, pp. 6299–6305.
Microsoft Mouse Menu Quick Reference Guide published by Microsoft for sale with its mouse Document No. 990973010-100-R01-0887, copyright 1987.

*Primary Examiner*—Jeffery A. Brier
*Attorney, Agent, or Firm*—Limbach, Limbach & Sutton

[57] ABSTRACT

In the present invention an input device for use with a digital computer having a video display for displaying the position of an indicator thereon is disclosed. The input device has means for converting rotational motion signals into conventional cursor key signals and also has a plurality of keys which include a numeric keypad and a plurality of control keys. A program controls the input device such that in the event the key signals are supplied, then said key signals are supplied to the computer. However, if no key signal is supplied, then the motion signals are converted into key signals and are then supplied to the digital computer. The input device also can receive the input signal and reprogram the function of the keys in response to that one input signal. Still, the input signal caused by activation of one of the plurality keys can cause the suspension and resumption of the tranfer of the motion signals to the computer. Finally, activation of one of the plurality keys can cause the activation of one or more of the plurality of commands that are displayed normally in the periphery of the display without the device or the indicator being moved to the position of the command.

10 Claims, 4 Drawing Sheets

SCHEMATIC OF THE IMPLEMENTATION

FLOW DIAGRAM OF THE HOST CONTROL PROGRAM

POSITION INDICATING DEVICE FOR A DIGITAL COMPUTER

TECHNICAL FIELD

The present invention relates to an input device for use with a digital computer having a video display and more particularly for displaying the position of an indicator thereon.

BACKGROUND OF THE INVENTION

Input devices to a digital computer are well known in the art. One type of input device is the so-called "mouse" wherein movement of the mouse causes a position indicator on a video display connected to the digital computer to move in the same direction and magnitude. Typically, a mouse comprises a pair of transducers which detect the movement of the mouse in two orthogonal directions and supplies those signals to the digital computer. In addition, a mouse usually has two or three keys which can be activated and whose signals are also supplied to the digital computer.

One of the shortcomings of the prior art mouse is that a mouse cannot be used to enter data, i.e. text or numbers. Further, the prior art mouse can be used to only issue a minimal number of commands. Because the mouse has only two or three keys, commands are entered by clicking, double clicking, or even triple clicking the keys on the mouse. This results in a maximum of nine types of different commands.

Another problem with prior art mouse is that many programs are written to display commands which are displayed on the periphery of the display device. In order to activate these commands, the mouse must be physically moved to cause the position indicator to be positioned over the commands thereby activating the commands. Once the command has been executed, the mouse must be moved back to the original position if the user wishes to continue at the original position.

Finally, although prior art mouses provided the capability for the user to reprogram the function of the mouse keys, the user must use the keyboard keys to reprogram the functions of the keys on the mouse.

SUMMARY OF THE INVENTION

In the present invention an improved position indicating device for use with a digital computer having a video display is disclosed. The video display displays the position of an indicator thereon. The input device has a first transducing means for generating a first motion signal in response to the input device moving in a first direction. The device also has a second transducing means for generating a second motion signal in response to the input device moving in a second direction which is substantially perpendicular to the first direction. Finally, the mouse has a plurality of keys which supply input signals to the input device.

In one embodiment, the video display displays a plurality of commands which are positioned generally to the periphery of the display and can be activated by the indicator being positioned thereon. The position indicating device further comprises means for receiving an input signal which is caused by the activation of one of the plurality of keys and activates one or more of the plurality of commands without the device and the indicator on the display being moved.

In another embodiment, the improvement to the position indicating device comprises means which receives an input signal caused by the activation of one of the plurality of keys and causes the suspension and resumption in the transfer of the one or more motion signals to the computer in response thereto.

In yet another embodiment, the improvement to the position indicating device comprises means which receives an input signal and reprograms the function of the plurality of keys in response to the input signal.

Finally, in yet still another embodiment, the improvement to the position indicating device comprises means for processing the first and second motion signals and the input signal by supplying the input signals to the digital computer in the event the input signals are supplied to the input device. In the event no input signal is supplied to the position indicating device, the direction of motion of the device as represented by the first and second motion signal is determined and is supplied to the digital computer.

BRIEF DESCRIPTION OF THE DRAWINGS

FIG. 1b is a bottom view of the improved input device shown in FIG. 1a.

DETAILED DESCRIPTION OF THE DRAWINGS

Figure 1A:
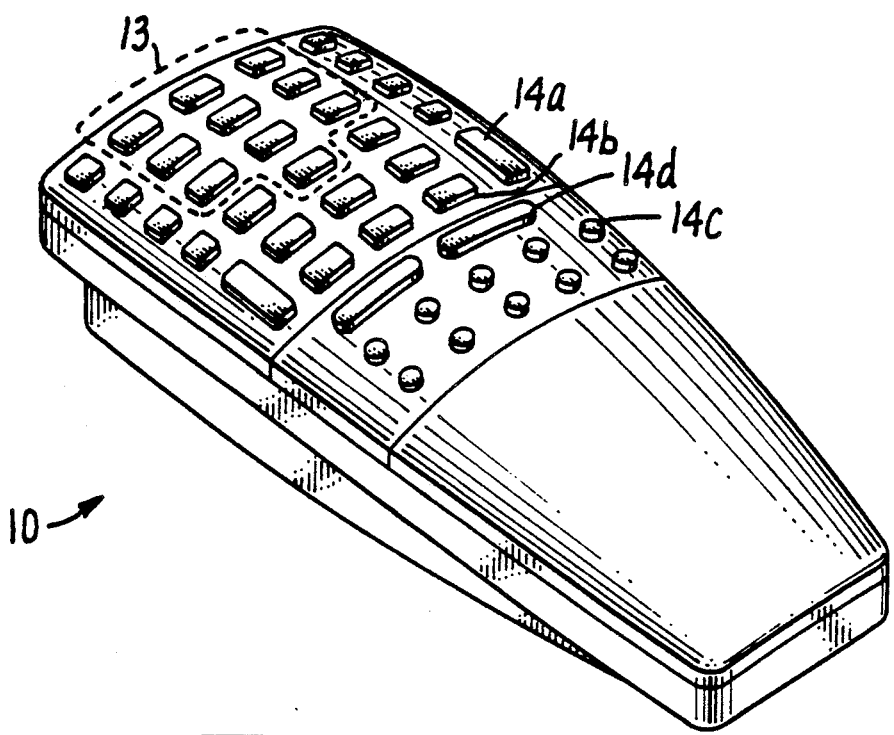
FIG. 1a is a perspective view of one embodiment of the improved input device of the present invention.
Figure 1B:
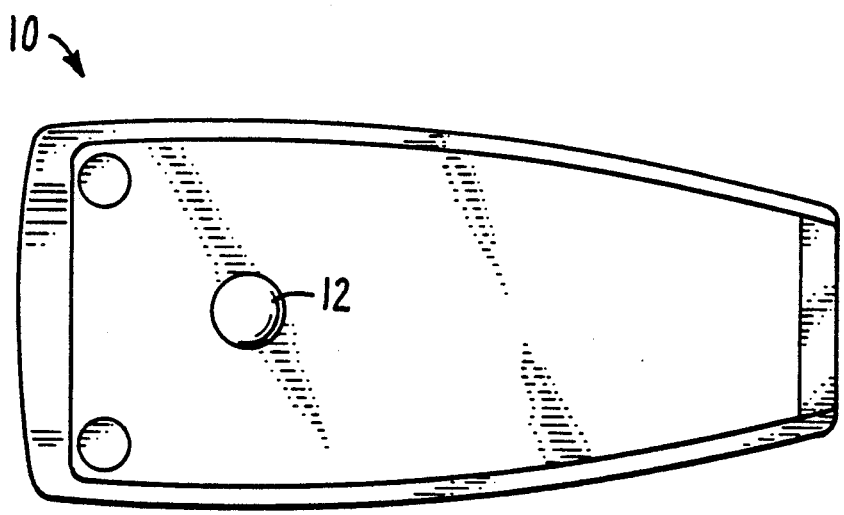

Referring to FIG. 1 there is shown an improved input device 10 of the present invention. The improved input device 10 comprises a rotating member 12 and a plurality of keys 14. The plurality of keys 14 include a numeric key pad 13 and a plurality of control keys 14(a–z). In one embodiment, there are fourty keys 14.

Figure 2:
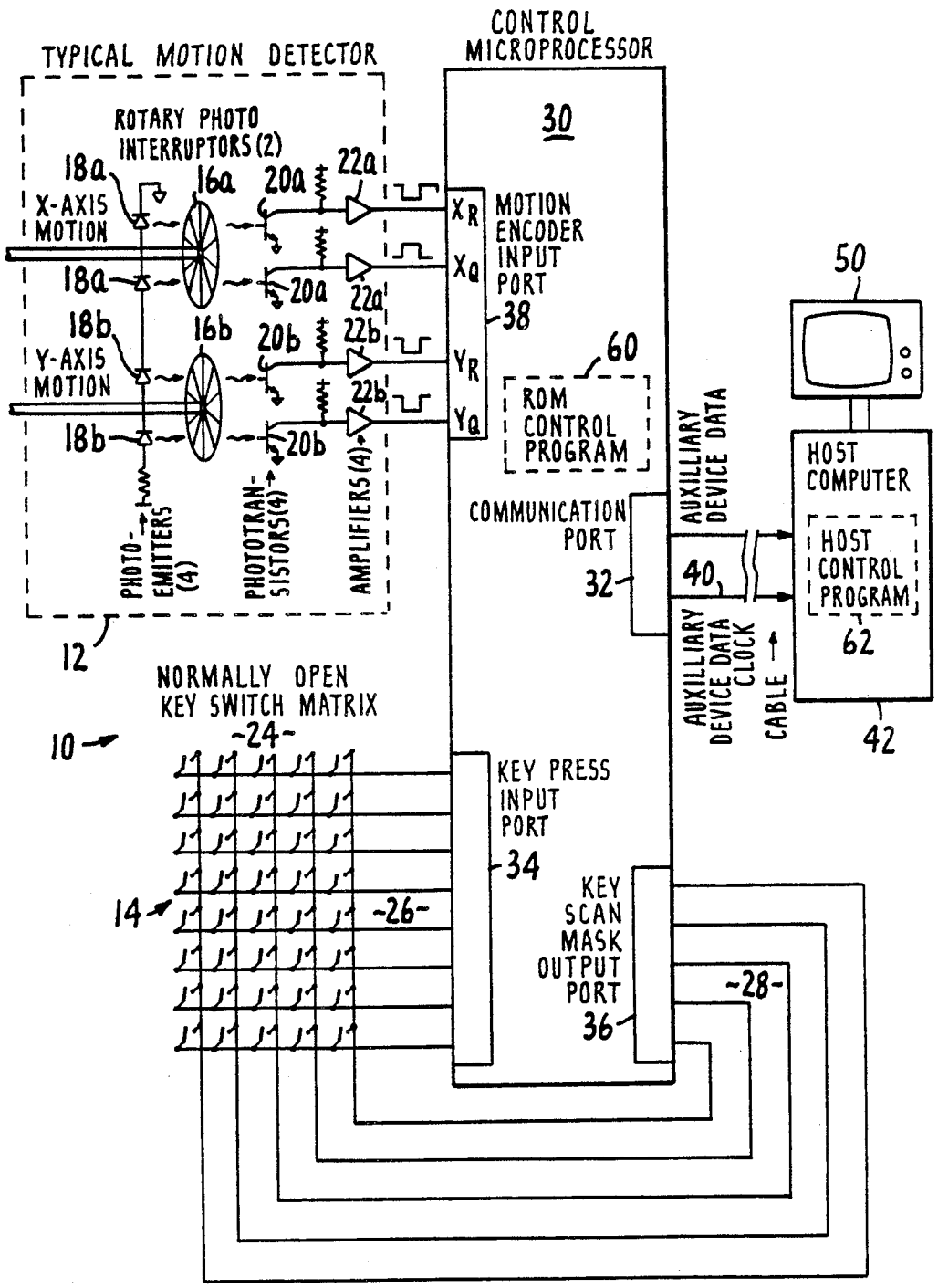
FIG. 2 is a schematic block diagram of one embodiment of a circuit incorporating the improved input device of the present invention for use with a digital computer and a video display.

Referring to FIG. 2 there is shown schematically a block level circuit diagram of the improved input device 10 of the present invention. The rotating member 12 is rotatable in two mutually orthogonal directions: labelled as x-axis and y-axis. In the x-axis, the rotating member 12 (typically a ball) rotates a first wheel 16a having a plurality of slots. The first wheel 16a is interposed between a pair of first photodiodes 18a and a pair of first phototransistors 20a. Each turn of the first wheel 16a causing the interruption of the light from the pair of first photodiodes 18a to the pair of first phototransistors 20a causes a pair of pulses to be generated. The first wheel, turning in one direction, generates a pair of similar pulses. In the opposite direction of rotation, the pair of pulses comprises a pulse and its inverse. This is well known in the art. The pair of pulses are amplified by a pair of first amplifiers 22a and are designated as $x_r$ and $x_q$ and are supplied to the motion encoder input port 38 of a control microprocessor 30.

Similarly, in the y-axis motion, the rotation of the rotating member 12 causes the rotation of the second wheel 16b. Like the first wheel 16a, the second wheel 16b is interposed between a pair of second photodiodes 18b which generate light and is received by a corresponding pair of second phototransistors 20b. The signals from the pair of second phototransistors 20b are then amplified by the pair of second amplifiers 22b causing the generation of the pair of pulses which are supplied on the line labeled $y_r$ and $y_q$ to the motion encoder input port 38.

As previously stated, the generation of the pulses on the lines $x_r$, $x_q$, $y_r$ and $y_q$ is well known in the art and the generation of these signals are based upon conventional design. The motion signals $x_r$, $x_q$, $y_r$ and $y_q$ are supplied to the control microprocessor 30, which in one embodiment, is a National Semiconductor part COPS820.

The plurality of keys 14 are connected to a key switch matrix 24. The key switch matrix 24 has an output thereof which is a plurality of lines 26 supplied to the key input port 34 of the control microprocessor 30. The control microprocessor 30 also has a key scan mask output port 36 which supplies a plurality of lines 28 to the key switch matrix 24. The function of the key scan mask output port 36 is to generate signals thereon which are supplied to the key switch matrix 24 to determined if any of the keys 14 have been depressed. This aspect of the device 10 to determine if any of the keys 14 has been activated is also of well known conventional design.

The control microprocessor 30 also has a second output port 32 which is connected via cable 40 to a host digital computer 42. The digital computer 42 has a video display 50 for displaying the position of an indicator thereon. The function of the improved input device 10 is to indicate the position of the indicator on the video display 50.

Figure 3:
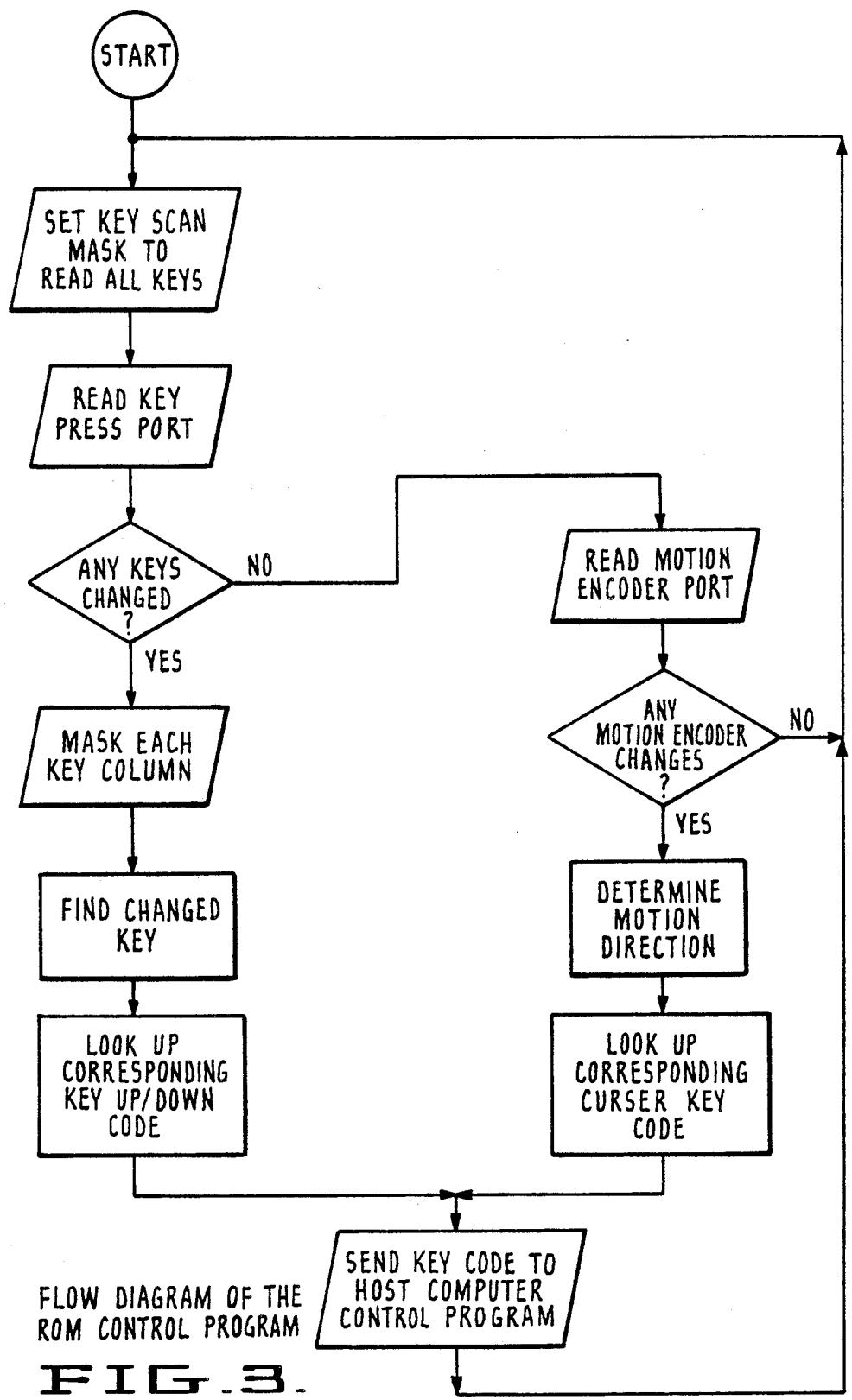
FIG. 3 is a flow diagram of an embodiment of a ROM control program which is resident in the improved input device of the present invention.

In one embodiment, the control microprocessor 30 has a control program which is stored in a Read Only Memory (ROM) 60. The function of the ROM control program 60 is shown in a flow diagram form in FIG. 3. The ROM control program 60 functions to operate the control microprocessor 30.

Initially, the key scan mask output port 36 is set such that all the lines 28 are activated to read all of the keys 14. Thereafter, the key press input port 34 is read to see if there is any signal from the input lines 26. If any key 14 has been activated, then each line of the output lines 28 from the key scan mask output port 36 is tested to test each column in the key switch matrix 24. The process of testing each column continues until the key 14 which has been activated is found. That signal, from the key press input port 34, is then used in a look up table to find the corresponding key code. The key code, in the form of a two byte code, is then sent from the communication port 32 to the host computer 40. In another embodiment, since the host computer 42 is an IBM personal computer or a compatible thereof, the corresponding key code would be an ASCII code. The ASCII code is then passed onto the communication port 32 and is sent over the cable 40 to the host computer 42.

It should be noted that in the event a key 14 is activated and simultaneously, there is movement of the device 10, causing the generation of signals into the motion encoder input port 38, then the ROM control program 60 would ignore the signals from the motion input port 38 and process the key signals from key input port 34. The signals from the key input port would be processed and sent on the output port 32 to the host computer 42.

In the event no key 14 is activated, then the control microprocessor 30 looks at the signals on the motion input port 38. If no signal is present on the motion encoder input port 38, then the control microprocessor 30 returns to the initial state. In the initial state, the key scan mask output port 36 is reset and the key input port 34 is read.

In the event signals are present on the motion encoder port 38, then the control microprocessor 30 determines the direction of the motion of the first wheels 16a and 16b. These signals are then converted into corresponding cursor control key codes and are then outputted onto the communication port 32 to the host computer 42. The cursor control keys are keys that are normally on the keyboard and indicate direction of movement for the position indicator, but using the depression of the key. Once the signal has been sent to the computer 42, then the input device 10 returns to the initial state. The checking of the key scan output port 36 is then re-initiated and the ROM control program 60 loops through its procedure as mentioned above. This cycle of looping occurs once every 5 milliseconds.

Figure 4:
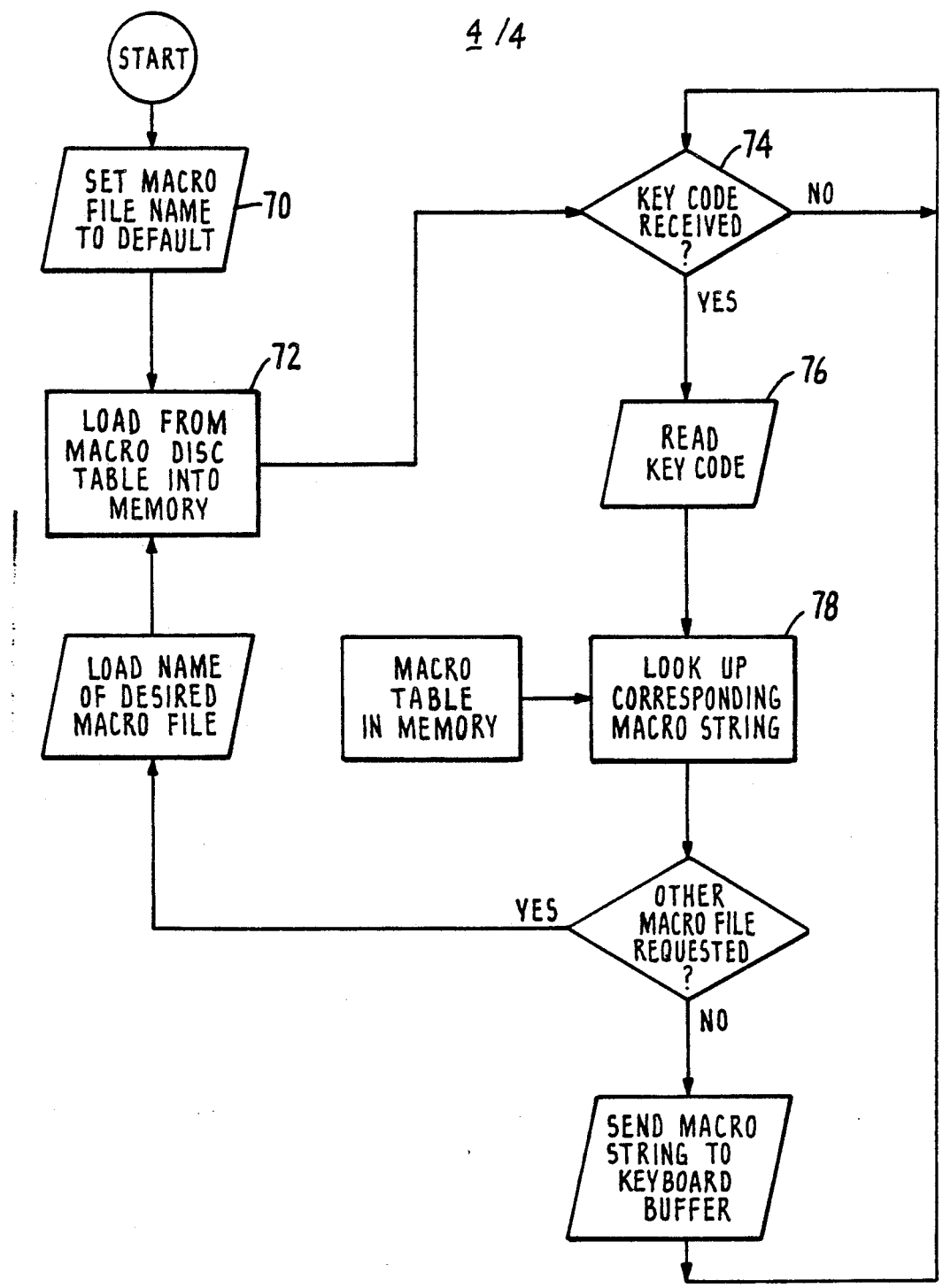
FIG. 4 is a flow diagram of an embodiment of a control program which is resident in the digital computer to which the improved input device of the present invention is connected.

In the present embodiment, once the keyboard signals from the control microprocessor 30 are sent over the cable 40 into the host computer 42, they are further processed by a control program 62 residing in the host computer 42. A general flow diagram of the control program 62 in the host computer 42 is shown in FIG. 4.

Initially, when the host computer 42 is started and the host control program 62 is activated, a default macro file is loaded from storage, such as disk, into the memory (state 72). The program 62 then branches to a state 74 where it determines if any signal is supplied from the control microprocessor 30 through the cable 40. If no input signal is received, then the host control program 62 simply waits and remains in the idle state 74.

If an input signal corresponding to a code for a particular key is received by the host control program 62 from the control microprocessor 30, then the code for that key is read by block 76. The key code read by the host control program 62 is then compared to the macro table in memory in block 78. The macro table is simply a table that lists various key codes to one or more other keys which replaces that key code. In short, a macro is a short hand whereby the activation of one key causes one or more other key signals to be generated. Of course, the key code in the macro table can also be the direct translation, i.e, no change in the functionality of the key.

One of the functions of a key can be the loading of other macro files from disk into memory. If that is the case, then control is branched to load another macro table from storage, such as disk, into memory. Once the other macro table is loaded into memory, then the control program 62 returns to the idle state 74. The program 62 remains in the idle state 74 until another input signal corresponding to a key code is received by the host computer 42.

If a key code read in state 76 does not call for the loading of a new macro table into memory, then the macro string (which can be the key code itself) that corresponds to the key code read is sent to the keyboard buffer of the host computer 42. The keyboard buffer is the area of the host computer 42 where application programs look to see what keys are activated by the keyboard and responds thereto. The control program 62 then returns to the waiting state 74.

With the ability to change the meaning of a particular key code read into a macro which comprises one or more other key strokes, a number of different embodiments for the input device 10 can be illustrated.

In one embodiment, the activation of the key "F1" can cause the host control program 62 to reprogram the function of the other keys 14, or even the "F1" itself. The "F1" key can cause the control program 62 to load a new macro wherein the "F1" key in the new macro would have a different meaning. Thus, if a user were operating a Word Perfect word processing application program on the host computer 42 and the function key of "F1" in that program normally performs the function of "cancel", then through the reprogramming capability by loading a new macro file into memory, the function key "F1" can be changed to perform the operation of "delete", or other functions. Furthermore, the user can dynamically change the meaning of the various keys while the user is running a particular application program, because the control program 62 can be memory resident. The user then has the capability of dynamically altering the functionality of the keys on the input device 10 with the user dictating the particular functions that are desired for the particular keys.

In another embodiment of the input device 10, the host control program 62 can be loaded with a macro table such that once a particular key (not cursor control key) is activated, then that action suspends the operation or the impact of any motion of the input device 30. As previously discussed, the ROM control program 60 does that to a certain extent in that if a key and a motion were performed simultaneously, then the input device 10 would send only the key signal to the computer 42. In this embodiment, however, the activation of a particular key can suspend any operation of any motion of the device 10 until the key to resume the response of the motion signal is received by the control program 62. In a sense, this is like the activation of the "NUM LOCK" key on a keyboard wherein a numeric key pad and cursor control keys share the same physical keys. In one application, for example, if one were operating with a spread sheet program such as Lotus 1-2-3, the activation of an "edit" key, for example, would cause the suspension of the control program 62 from processing any of the vertical cursor keys generated by the control microprocessor 30 based upon the rotation of the body 12. The vertical cursor keys are then resumed or are activated when the enter key is pressed. Thereafter, the position indicator can be used by the movement of the rotating body 12. In this manner, when the user is editing data in a particular location or cell, the movement of the input device 12 will not cause the position indicator or cursor to move to another location or cell until the user has finished editing or inputting the entire data as signified by activating the "enter" key.

The suspension of the processing of the cursor keys from the control microprocessor 30 can be in either the x direction or the y direction or both.

Finally, most importantly, in many applications, where an input device is used, a video display 50 displays a plurality of commands which are positioned generally to the periphery of the display 50. These commands are activated when the position indicator is positioned on the command. One drawback of such a system is that in order to activate the command, one must leave the present position to position the indicator on the command in order to activate it. If one were performing a very position intensive application such as CAD, CAM, or desktop publishing operation, then difficulty arises in returning to the original position after activation of the command.

In the apparatus of the present invention, the host control program 62 can load a macro such that a particular key that is activated would cause one or more of the commands that is displayed on the periphery of the display to be activated without the input device 10 or the indicator being moved. Thus, there is greater control of the indicator by being able to activate the commands without moving the input device or the position indicator to the position of the commands.

From the foregoing, it can be appreciated that the invention is independent of the "split" in software between the ROM control program 60 and the HOST control program 62. Clearly, they can be part of a single program resident in the microprocessor 30, or in the host computer 42. In fact in one implementation, a prior art Logitech mouse was connected to an IBM personal computer, in which the rotational position information was supplied on the serial port of the computer and the keystroke information was supplied on the parallel port of the computer. A single program (Exhibit A) was used as the HOST control program 62 to control the operation of the mouse, in accordance with the present invention.

As can be seen from the foregoing, there are many advantages to the input device of the present invention. First and foremost is that the device generates conventional key signals which can be used by any program and yet the input device has rotating member 12 which facilitates the movement of the position indicator on the display device. Further, with the residence of the host control program 62, key signals from the control processor 30 can be translated and further processed to provide a number of embodiments which improve the operation of an input device.

What is claimed is:

1. An input device for use with a digital computer having a video display, for displaying the position of an indicator thereon and responsive to cursor key signals for moving said indicator, said device comprising:
   first transducing means for generating a first motion signal in response to said input device moving in a first direction;
   second transducing means for generating a second motion signal in response to said input device moving in a second direction substantially perpendicular to said first direction;
   a plurality of keys including a numeric keypad and a plurality of control keys for supplying input signals to said input device; and
   means for processing said first and second motion signals and said input signals by supplying said input signals to said digital computer in the event said input signals are supplied to said input device, and for supplying input signals to said digital computer corresponding to the direction and amount of motion of said input device from said first and second motion signals, in the event no input signal from the plurality of keys is supplied to said input device.

2. The device of claim 1 further comprising:
   means for receiving an input signal caused by activation of one of said plurality of keys and for reprogramming the function of said plurality of keys in response to said input signal.

3. The device of claim 1 further comprising:
   means for receiving an input signal caused by activation of one of said plurality of keys and permanently suspending the transfer of said one or more motion signals to said computer in response thereto.

4. The device of claim 1 wherein said display also displays a plurality of commands positioned generally to the periphery of said display and activated by said indicator being positioned thereon.

5. The device of claim 4 further comprising:
means for receiving an input signal caused by activation of one of said plurality of keys and for activating one or more of said plurality of commands without said device and indicator being moved.

6. A position indicating device for use with a digital computer having a display for displaying the position of an indicator thereon and responsive to cursor key signals for moving said indicator, said position indicating device comprising:
first transducing means for generating a first motion signal in response to said device moving in a first direction;
second transducing means for generating a second motion signal in response to said device moving a second direction, substantially perpendicular to said first direction;
a plurality of keys, each for supplying an input signal to said device; and
means for receiving a first input signal for permanently suspending the transfer of said one or more motion signals to said computer, in response thereto and for receiving a second input signal for thereafter resuming the transfer of said one or more motion signals to said computer in the absence of other input signals.

7. The device of claim 6 further comprising:
means for receiving an input signal caused by activation of one of said plurality of keys and for reprogramming the function of said plurality of keys in response to said input signal.

8. The device of claim 6 wherein said receiving means further comprising:
means for processing said first and second motion signals and said input signals by supplying said input signals to said digital computer in the event said input signals are supplied to said device, and for supplying input signals to said digital computer corresponding to the direction and amount of motion of said device from said first and second motion signals, in the event no input signal from the plurality of keys is supplied to said device.

9. The device of claim 6 wherein said display also displays a plurality of commands positioned generally to the periphery of said display and activated by said indicator being positioned thereon.

10. The device of claim 9 further comprising:
means for receiving an input signal caused by activation of one of said plurality of keys and for activating one or more of said plurality of commands without said device and indicator being moved.

* * * * *